United States Patent [19]

Hayakawa et al.

[11] Patent Number: 4,718,311
[45] Date of Patent: Jan. 12, 1988

[54] HYDRAULIC CONTROL SYSTEM FOR AUTOMATIC TRANSMISSIONS

[75] Inventors: Yoichi Hayakawa, Toyoake; Masao Kawai, Chiryu; Seiichi Nishikawa, Toyokawa; Kagenori Fukumura, Toyota, all of Japan

[73] Assignees: Aisin-Warner Limited, Toyota; Toyota Jidosha Kabushiki Kaisha, Anjo, both of Japan

[21] Appl. No.: 791,444

[22] Filed: Oct. 25, 1985

[30] Foreign Application Priority Data

Oct. 26, 1984 [JP] Japan ............................. 59-226452

[51] Int. Cl.[4] .............................................. B60K 41/10
[52] U.S. Cl. ................................... 74/868; 74/752 C; 180/247
[58] Field of Search ............. 74/868, 869, 867, 752 C; 180/247

[56] References Cited

U.S. PATENT DOCUMENTS

| | | | |
|---|---|---|---|
| 4,369,671 | 1/1983 | Matsumoto et al. | 180/247 X |
| 4,444,073 | 4/1984 | Moroto et al. | 74/869 X |
| 4,484,654 | 11/1984 | Hayakawa | 180/247 |
| 4,503,927 | 3/1985 | Hayakawa et al. | 180/247 |

FOREIGN PATENT DOCUMENTS

58-128929 8/1983 Japan ................................... 180/247

Primary Examiner—Leslie Braun
Assistant Examiner—Dwight G. Diehl
Attorney, Agent, or Firm—Spencer & Frank

[57] ABSTRACT

A hydraulic control system for an automatic transmission has an inhibitor valve which comprises a change-over valve having a first set position and a second set position and functioning to supply and discharge a hydraulic pressure to and from a hydraulic servomechanism for a friction engaging element through its movement between the first and second set positions; an arrangement for urging the change-over valve to the first set position; a plunger having a first set position and a second set position and functioning to bring the change-over valve into the second set position when the plunger is urged to the second set position. The inhibitor have functions to perform the supply and discharge of the hydraulic pressure to and from the hydraulic servomechanism in accordance with a first hydraulic signal and a second hydraulic signal through an arrangement which produces the first hydraulic signal for urging the change-over valve to the second set position and urging the plunger to the first set position. An arrangement produces the second hydraulic signal for urging the plunger to the second position; and an arrangement delays a discharge of the second hydraulic signal.

5 Claims, 8 Drawing Figures

FIG. 8

HYDRAULIC CONTROL SYSTEM FOR AUTOMATIC TRANSMISSIONS

BACKGROUND OF THE INVENTION

The present invention relates to a hydraulic control system for automatic transmissions.

DESCRIPTION OF THE PRIOR ART

Heretofore there has been proposed a hydraulic control system for an automatic transmission having a four wheel driving transfer provided with a speed change mechanism capable of selecting a two-wheel drive condition (H2) or a four-wheel drive high speed range (H4) or a four-wheel drive low speed range (L4), and an inhibitor valve of a transfer oil pressure controller which restricts the change of the shift range of the four-wheel driving transfer to the four-wheel drive low speed range (L4) in accordance with vehicular running conditions such as wheel speed, etc. to reduce a speed change shock and prevent an engine overrun.

The above inhibitor valve has a spool as a change-over valve and a plunger connected in series with the spool, the spool having a one-end land with a spring attached to the back thereof as well as an intermediate land and an opposite-end land, and the plunger having a one-end land of a diameter somewhat larger than that of the spool land and an opposite-end land of a diameter larger than that of said one-end land. In such inhibitor valve, there are formed an opposite-end oil chamber to which is supplied a line pressure when the selection means is at the four-wheel drive high speed range (H4), and an intermediate oil chamber to which is supplied an oil pressure related to a vehicle speed and which is defined by the opposite-end land of the spool and the one-end land of the plunger.

Problems to be Solved by the Invention

The above conventional hydraulic control system in an automatic transmission is applied to a four-wheel driving transfer, for example, in which when the vehicle speed is not lower than a preset value and the shift range is in the two-wheel drive condition (H2) or four-wheel drive high speed range (H4), if the selector means is set to the four-wheel drive low speed range (L4), the line pressure is discharged from the other-end oil chamber of the inhibitor valve, but since the vehicle speed-related oil pressure is supplied to the opposite-end land of the spool, the spool does not move, while only the plunger moves to the other side, allowing the shift range of the four-wheel driving transfer to be set to the four-wheel drive high speed range (H4). In this case, if the moving speed of the plunger to the other side is too high, the oil pressure in the intermediate oil chamber to which is supplied the vehicle speed-related oil pressure drops and the spool moves, causing the shift range of the four-wheel driving transfer to become the four-wheel drive low speed range (L4).

In the event of such a phenomenon, there may occur an engine overrun and a speed change shock due to a sudden down shift during a vehicular high-speed running.

Summary of the Invention

It is the object of the present invention to provide a hydraulic control system in an automatic transmission capable of preventing a malfunction of an inhibitor valve.

This object and others to become apparent as the specification progresses, are accomplished by the invention, according to which, briefly stated, the hydraulic control system for an automatic transmission has an inhibitor valve which comprises a change-over valve having a first set position and a second set position and functioning to supply and discharge a hydraulic pressure to and from a hydraulic servomechanism for a friction engaging element through its movement between the first and second set positions; and arrangement for urging the change-over valve to the first set position; a plunger having a first set position and a second set position and functioning to bring the change-over valve into the second set postion when the plunger is urged to the second set position. The inhibitor valve functions to perform the supply and discharge of the hydraulic pressure to and from the hydraulic servomechanism in accordance with a first hydraulic signal and a second hydraulic signal through an arrangement which produces the first hydraulic signal for urging the change-over valve to the second set position and urging the plunger to the first set position. An arrangement produces the second hydraulic signal for urging the plunger to the second position; and an arrangement delays a discharge of the second hydraulic signal.

DESCRIPTION OF THE PREFERRED EMBODIMENT

[Means for solving the Problems]

Figure 1:
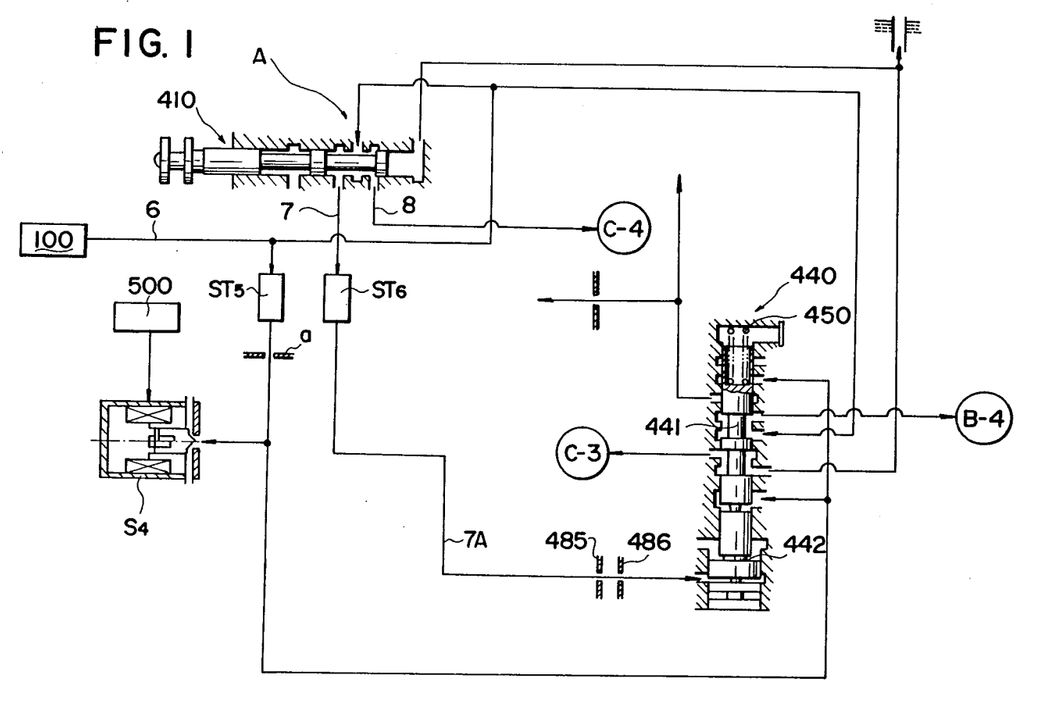
FIG. 1 is a hydraulic circuit diagram showing a hydraulic control system for an automatic transmission.

According to the present invention, as shown in FIG. 1, a hydraulic control system A in an automatic transmission has an inhibitor valve 440 which comprises a change-over valve 441 having a first set position (a lower position shown) and a second set position (an upper position shown) and functioning to supply and discharge a hydraulic pressure to and from hydraulic servomechanisms C-3 and B-4 for frictional engaging elements through its movement between the above first set position (a lower position shown) and the above second set position (an upper position shown), a means such as a spring 450 for urging the change-over valve 441 to the above first set position, and a plunger 442 having a first set position (a lower position shown) and a second set position (an upper position shown) and functioning to bring the change-over valve 441 into the above second set position (an upper position show)

when urged to the second set position (an upper position shown). In such hydraulic control system A, the inhibitor valve 440 performs the supply and discharge of a hydraulic pressure to and from the hydraulic servo-mechanism B-4, etc. selectively in accordance with first and second hydraulic signals through a first hydraulic signal generating means which urges the change-over valve 441 to the above second set position (an upper position shown) and urges the plunger 442 to the above first set position (a lower position shown) and which is provided with an orifice "a", an electronic controller 500 and a solenoid valve S4, a second hydraulic signal generating means such as a transfer manual valve 410 which urges the plunger 442 to the above second set position (an upper position shown), and means 485 and 486 for delaying the above second hydraulic signal.

The hydraulic control system for an automatic transmission of the present invention constructed as above has the following function and effect.

Since there is provided a means for delaying the second hydraulic signal, the movement of the plunger with the second hydraulic signal is performed slowly and the variation of the first hydraulic signal can be prevented by the movement of the plunger, thereby permitting prevention of a malfunction of the inhibitor valve.

The hydraulic control system for an automatic transmission of the present invention will be described below on the basis of an embodiment thereof illustrated in the drawings.

Figure 3:
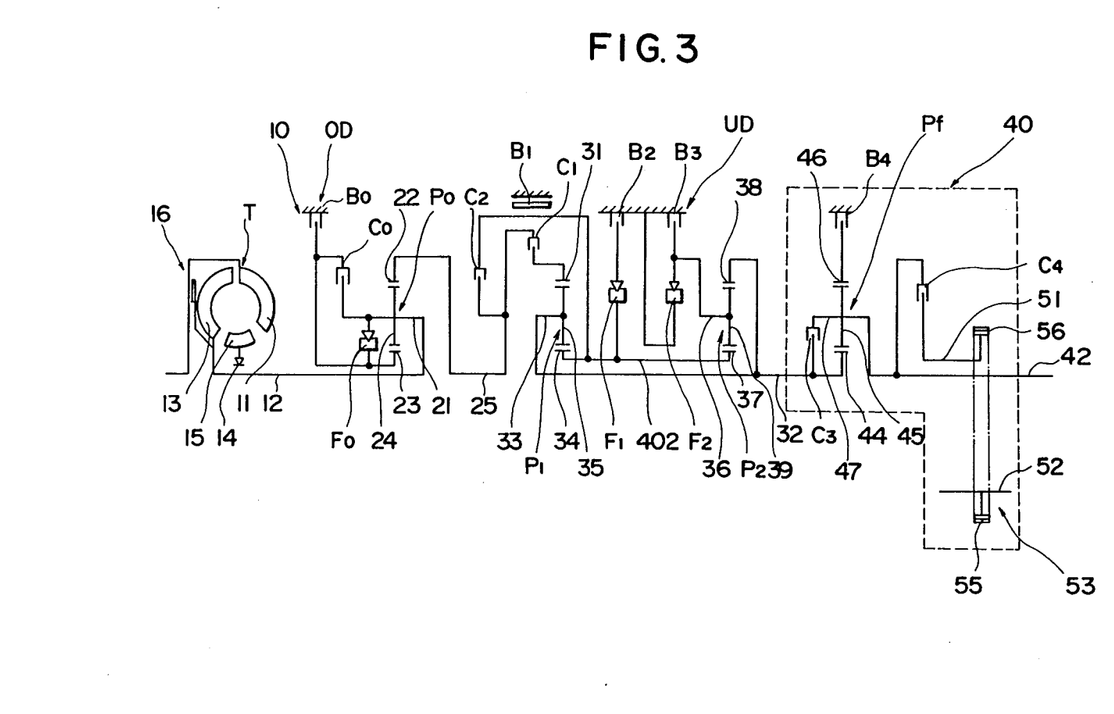
FIG. 3 is a skeletal view of FIG. 2.

FIG. 1 is a schematic view of a four wheel drive vehicle and FIG. 3 is a skeletal view thereof.

The numeral 10 denotes a four speed range automatic transmission and numeral 40 denotes a four wheel driving transfer as a sub transmission connected to an output shaft 32 of the four speed range automatic transmission 10.

The four wheel driving transfer 40 is attached to the four speed range automatic transmission mounted on an engine E. A first output shaft 42 is connected to a rear wheel driving propeller shaft C, while a second output shaft 52 is connected to a front wheel driving propeller shaft B.

The four speed range transmission 10 is provided with a fluid torque converter T, an overdrive mechanism OD and an underdrive mechanism UD of three forward shift ranges and one reverse shift range.

The torque converter T comprises a pump 11, a turbine 13, a stator 15 and a direct-coupled clutch 16, and an output shaft 12 of the torque converter T serves as an input shaft of the overdrive mechanism OD.

The pump 11 is connected to an output shaft of the engine E and the turbine 13 is connected to the output shaft 12 of the torque converter T. The stator 15 is connected to a stationary part through a one-way clutch 14.

The overdrive mechanism OD comprises a multiple disc clutch Co as a frictional engaging element, a multiple disc brake Bo as a frictional engaging element, a one-way clutch Fo as a frictional engaging element, and a planetary gear set Po. The overdrive mechanism OD has an output shaft 25, which also serves as an input shaft of the underdrive mechanism UD of three forward shift ranges and one reverse shift range.

The planetary gear set Po comprises a carrier 21, a ring gear 22, a sun gear 23 and a planetary pinion 24. In the planetary gear set Po, by a selective engagement of the frictional engaging elements (multiple disc clutch Co, multiple disc brake Bo and one-way clutch Fo) the components are fixed to a stationary member such as a transmission case or connected to an input shaft, output shaft or another component, or such a fixing or connection is released.

The carrier 21 is connected to the input shaft (12) and the ring gear 22 is connected to the output shaft 25 of the overdrive mechanism OD. The sun gear 23 is rotatably fitted on the input shaft (12) and is fixed to the transmission case through the brake Bo; further, it is connected to the carrier 21 through the clutch Co and the one-way clutch Fo which is disposed in parallel with the clutch Co. The planetary pinion 24 is rotatably supported by the carrier 21 and it is in mesh with the sun gear 23 and ring gear 22.

The underdrive mechanism UD comprises multiple disc clutches C1 and C2 as frictional engaging elements, a belt brake B1 as a frictional engaging element, multiple disc brakes B2 and B3 as frictional engaging elements, one-way clutches F1 and F2 as frictional engaging elements, a front planetary gear set P1 and a rear planetary gear set P2.

The front planetary gear set P1 comprises a ring gear 31, a carrier 33, a sun gear 34 and a planetary pinion 35.

The ring gear 31 is connected to the input shaft (25) through the clutch C1. The carrier 33 is connected to an output shaft 32 of the underdrive mechanism UD. The sun gear 34 is connected to the input shaft (25) through the clutch C2 and fixed to the transmission case through the belt brake B1, brake B2 disposed in parallel with the belt brake B1 and one-way clutch F1 disposed in series with the brake B2. The planetary pinion 35 is rotatably supported by the carrier 33 and it is in mesh with the sun gear 34 and ring gear 31.

The rear planetary gear set P2 comprises a carrier 36, a sun gear 37, a ring gear 38 and a planetary pinion 39.

The carrier 36 is fixed to the transmission case through the brake B3 and the one-way clutch F2 disposed in parallel with the brake B3. The sun gear 37 is integrally formed on a sun gear shaft 402 together with the sun gear 34 of the front planetary gear set P1. The ring gear 38 is connected to the output shaft 32. The planetary pinion 39 is rotatably supported by the carrier 36 and it is in mesh with the sun gear 37 and ring gear 38.

A main transmission shift lever (not shown) attached to the driver's seat for driving a manual valve 210 of a main hydraulic controller 100 has a main shift position MSP of P (Parking), R (Reverse), N (Neutral), D (Drive), S (Second) and L (Low) ranges. Table 1 shows a relation between the set ranges of the main shift position MSP as well as fourth (4), third (3), second (2), first (1) speed change drives and the operation of the clutches and brakes.

TABLE 1

| MSP | $S_1$ | $S_2$ | $S_3$ | $C_1$ | $C_2$ | $C_0$ | $B_1$ | $B_2$ | $B_3$ | $B_0$ | $F_1$ | $F_2$ | $F_0$ |
|---|---|---|---|---|---|---|---|---|---|---|---|---|---|
| P |   | X | X | X | X | E | X | X | X | X | f | f | f |
| R |   | X | X | X | E | E | X | X | E | X | f | f | f |
| N |   | X | X | X | X | E | X | X | X | X | f | f | f |
| D |   |   |   |   |   |   |   |   |   |   |   |   |   |
| 1 |   | X | X | E | X | E | X | X | X | X | f | L | (L) |
| 2 |   |   | E | X | E | X | E | X | X | L | f | (L) |   |
| 3 | X |   | E | E | E | X | E | X | X | f | f | (L) |   |
| 4 | X | X |   | E | E | X | X | E | X | E | f | f | f |
| S |   |   |   |   |   |   |   |   |   |   |   |   |   |
| 1 |   | X | X | E | X | E | X | X | X | X | f | L | (L) |
| 2 |   |   | E | X | E | E | X | X | X | (L) | f | (L) |   |
| 3 | X |   | E | E | E | X | E | X | X | f | f | (L) |   |
| (3) | X | X | X | E | E | E | X | E | X | X | f | f | (L) |
| L |   |   |   |   |   |   |   |   |   |   |   |   |   |

TABLE 1-continued

| MSP | S1 | S2 | S3 | C1 | C2 | C0 | B1 | B2 | B3 | B0 | F1 | F2 | F0 |
|---|---|---|---|---|---|---|---|---|---|---|---|---|---|
| 1 |  | X | X | E | X | E | X | X | E | X | f | (L) | (L) |
| 2 |  |  | X | E | X | E | E | E | X | X | (L) | f | (L) |
| (1) | X | X | X | E | X | E | X | X | E | X | f | (L) | (L) |

Figure 4:
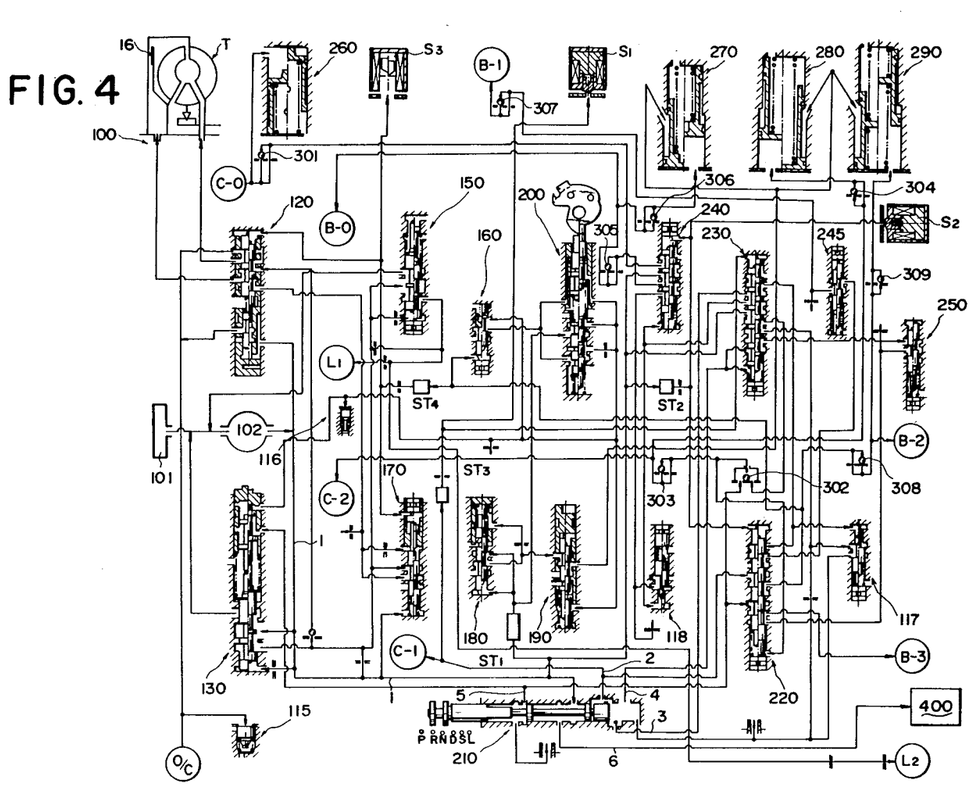
FIG. 4 is a hydraulic circuit diagram of an automatic four speed range transmission.

FIG. 4 illustrates the main hydraulic controller 100 of the four speed range automatic transmission 10.

The numeral 101 denotes an oil strainer; numeral 102 denotes a hydraulic pump; numeral 115 denotes a cooler bypass valve; and numeral 116 denotes a pressure relief valve. Numeral 117 denotes a release clutch control valve; numeral 118 denotes a release brake control valve; numeral 120 denotes a lockup relay valve; numeral 130 a regulator valve; numeral 150 a second regulator valve; numeral 160 a cut-back valve; and numeral 170 denotes a lock-up control valve. Numeral 180 denotes a first accumulator control valve; numeral 190 denotes a second accumulator control valve; 200 denotes a throttle valve; and numeral 210 denotes a manual valve. Numeral 220 denotes a 1-2 shift valve; numeral 230 denotes a 2-3 shift valve; numeral 240 denotes a 3-4 shift valve; numeral 245 denotes an intermediate coast modulator valve for adjusting the oil pressure to be supplied to the brake B1; and numeral 250 denotes a low coast modulator valve for adjusting the oil pressure to be supplied to the hydraulic servomechanism B-3. Numeral 260 denotes an accumulator for smoothing the engagement of the clutch Co; numeral 270 denotes an accumulator for smoothing the engagement of the brake Bo; numeral 280 denotes an accumulator for smoothing the engagement of the clutch C2; numeral 290 denotes an accumulator for smoothing the engagement of the brake B2, numerals 301, 303, 304, 305, 306, 307, 308 and 309 denote flow control valves each provided with a check valve for controlling the flow rate of pressure oil to be supplied to hydraulic servomechanisms C-0, C-1, C-2 of the clutches C0, C1, C2 and hydraulic servomechanisms B-0, B-1, B-2, B-3 of the brakes B0, B1, B2, B3. Numeral 302 denotes a shuttle valve. S1 denotes a first solenoid valve adapted to be opened and closed by the output of a later-described electronic controller (computer) to control the 2-3 shift valve 230; S2 denotes a second solenoid valve for controlling both the 1-2 shift valve 220 and 3-4 shift valve 240; and S3 denotes a third solenoid valve for controlling both the lockup relay valve 120 and lockup control valve 170. Numeral 1 denotes a line oil pressure output oil passage (hereinafter referred to simply as "oil passage"). Numerals 2, 3, 4, 5 and 6 denote line oil pressure oil passages for connecting valves and hydraulic cylinders of clutches and brakes. Further, ST1, ST2, ST3 and ST4 denote oil strainers each provided between oil passages; L1 and L2 denote lubricating oil passages; and O/C denotes an oil cooler.

Hydraulic oil which has been pumped up from the oil pressure source through the oil strainer 101 by means of the hydraulic pump 102 is adjusted to a predetermined pressure level (line pressure) and then fed to the oil passage 1.

Figure 5:
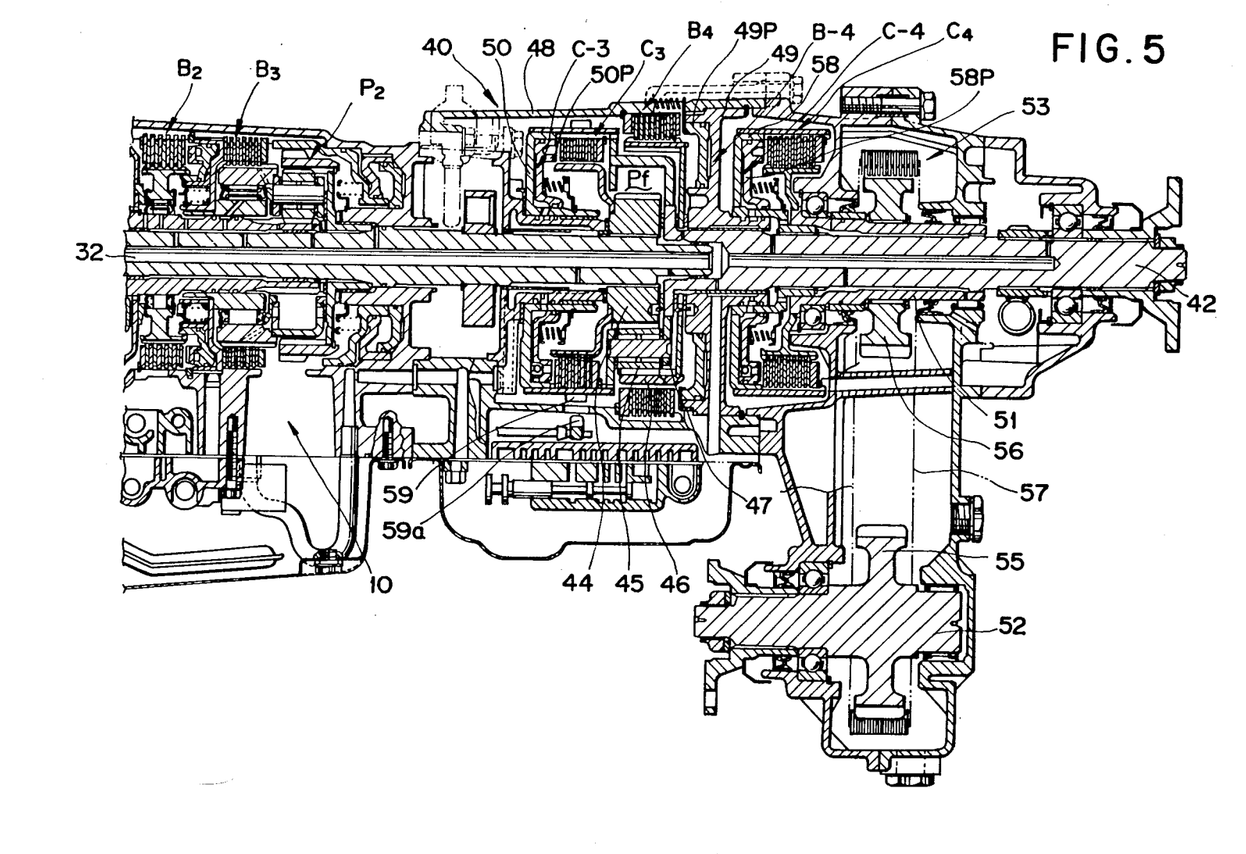
FIG. 5 is a sectional view of a sub transmission of the automatic four speed range transmission.

FIG. 5 illustrates the four wheel driving transfer 40 of the automatic four speed range transmission.

The four wheel driving transfer 40 comprises a brake B4, clutches C3 and C4 as frictional engaging elements, the first output shaft 42 of the four wheel driving transfer 40, a planetary gear set Pf, a four wheel driving sleeve 51, a second output shaft 52 and a transmission mechanism 53.

The brake B4 is a multiple disc friction brake for engagement of the ring gear 46 with the transfer case 48, and it is operated by a hydraulic servomechanism B-4 which is composed of a cylinder 49 formed within the transfer case 48 and a piston 49P mounted within the cylinder 49.

The clutch C3, which is disposed on the side of the automatic four speed range transmission of the planetary gear set Pf, is a multiple disc friction clutch for connecting and disconnecting the sun gear 44 and the carrier 47 and it is operated by a hydraulic servomechanism C-3 which is composed of a cylinder 50 connected to the carrier 47 and a piston 50P mounted within the cylinder 50.

The clutch C4 is a multiple disc friction clutch for connection and disconnection between the first output shaft 42 which is connected to the carrier 47 and the sleeve 51 which is connected to one sprocket 56 of the four wheel driving transfer 40. It is operated by a hydraulic servomechanism C-4 which is composed of a cylinder 58 supported rotatably by the transfer case 48 and a piston 58P mounted within the cylinder 58.

The first output shaft 42 of the four wheel driving transfer 40 receives power from the output shaft 32 of the planetary gear sets P1 and P2 and it is disposed in series with this input shaft (32).

The four wheel driving sleeve 51 is rotatably fitted on the first output shaft 42.

The second output shaft 52 is disposed in parallel with the input shaft 32 and in a direction opposite to the first output shaft 42.

The planetary gear set Pf comprises a sun gear 44, a planetary pinion 45, a ring gear 46 and a carrier 47 and it is disposed between the input shaft (32) and the first output shaft 42.

The sun gear 44 is splined to an end portion of the input shaft (32). The planetary pinion 45 is in mesh with the sun gear 44 and ring gear 46. The carrier 47, which holds the planetary pinion 45 rotatably, is connected to a fore end of the first output shaft 42 of the four wheel driving transfer 40.

The transmission mechanism 53, which is disposed between the sleeve 51 and the second output shaft 52, comprises the sprocket 56 splined to the sleeve 51, a sprocket 55 formed on the second output shaft 52 and a chain 57 stretched between the sprockets 55 and 56.

A parking gear 59 is provided on the outer peripheral side of the cylinder 50 of the hydraulic servomechanism C-3. When the shift lever of the automatic four speed range transmission 10 is selected to the parking position, a holdfast 59a comes into engagement with the parking gear 59 to fix the first output shaft 42.

Figure 2:
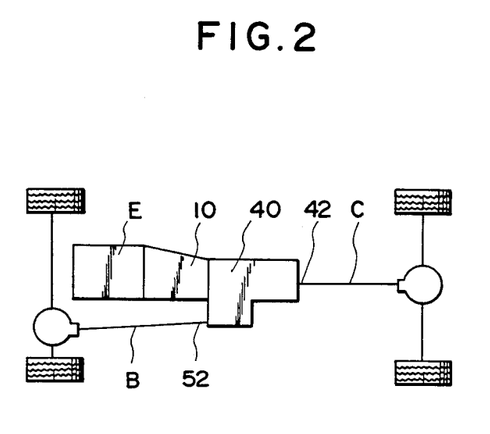
FIG. 2 is a schematic view of a four wheel drive vehicle.

During normal running, the line pressure fed to the hydraulic control system of the automatic transmission is supplied to the hydraulic servomechanism C-3 to turn ON the clutch C3, while the pressure of the hydraulic servomechanism B-4 and that of C-4 are discharged to release the brake B4 and clutch C4, whereby the sun gear 44 of the planetary gear set Pf and the carrier 47 are connected together and power is transmitted from the input shaft (32) to the first output shaft 42 at a reduction ratio of 1 and only the rear wheels are allowed to run in the two-wheel drive high speed range (H2). At this time, the power from the input shaft (32) is transmitted from the carrier 47 to the first output shaft 42 through the clutch C3 without going through the sun gear 44, planetary pinion 45 and ring gear 46, so the tooth surface of each gear is free from imposition of load, thus prolonging the gear life. During vehicular running in this two-wheel drive high speed range (H2), if it becomes necessary for the vehicle to run in a four wheel drive condition, then by manually shifting the shift lever provided near the driver's seat and allowing the line pressure to be supplied gradually to the hydraulic servomechanism C-4 of a transfer controller 400 which is a sub hydraulic controller of the four wheel driving transfer 40, thereby turning ON the clutch C4 smoothly, the first output shaft 42 and the four wheel driving sleeve 51 are connected together and power is transmitted also to the front wheels through the transmission mechanism 53, second output shaft 52 and front wheel driving propeller shaft B (shown in FIG. 2), further a power transmission is made from the input shaft (32) to the first output shaft 42 and second output shaft 52 at a reduction ratio of 1 and thus the four-wheel drive high speed range (H4) is obtained. During vehicular running in this four-wheel drive high speed range (H4), if it becomes necessary to increase the output torque for example on a steep slope, then by shifting the shift lever manually, the oil pressusre to the hydraulic servomechanism is exerted on the inhibitor valve 440 which functions to change over between the four-wheel drive high speed range (H4) and the four-wheel drive low speed range (L4), to supply the line pressure gradually to the hydraulic servomechanism B-4, and at the same time the oil pressure of the hydraulic servomechanism C-3 is discharged at an appropriate timing, thereby actuating the brake B4 gradually and releasing the clutch C3 smoothly. As a result, the sun gear 44 and the carrier 47 are released while the ring gear 46 is-fixed, and the power is decelerated from the input shaft (32) through the sun gear 44, planetary pinion 45 and carrier 47 and is transmitted to the first output shaft 42 and second output shaft 52, whereby there is obtained the four-wheel drive low speed range (L4) of a large torque.

A shift lever (not shown) of the four wheel driving transfer 40 provided near the driver's seat for driving the transfer manual valve 410 has a sub shift position SSP of two-wheel drive high speed (H2), four-wheel drive high speed (H4) and four-wheel drive low speed (L4) ranges. Table 2 shows an operational relation between the set ranges of the sub shift position SSP and the engagement and release of the brakes B4 and clutches C3, C4 as well as vehicular running conditions.

TABLE 2

| SSP | S4 | C3 | B4 | C4 | Running Condition |
|-----|----|----|----|----|-------------------|
| H2  | α  | E  | X  | X  | H2                |
| H4  | α  | E  | X  | E  | H4                |
|     |    | X  | E  | E  | L4                |
| L4  | X  | E  | X  | E  | H4                |
|     | β  | X  | E  | E  | L4                |

In Tables 1 and 2, the "O" mark of S1, S2 and S4 represents energization and the "X" mark of S1, S2, S3 and S4 represents non-energization. The " " mark indicates that a lockup condition is obtained by energizing S3. The "α" mark indicates that once S4 is deenergized, the two-wheel drive high speed range (H2) or four-wheel drive high speed range (H4) as a direct-coupled running state is maintained even if S4 is energized. The mark "β" indicates that once S4 is energized, the four-wheel drive low speed range (L4) as a decelerated running condition is maintained even if S4 is deenergized. "E" indicates that the corresponding clutch and brake are in a state of engagement and "X" indicates that the corresponding clutch and brake are in a released condition. "L" indicates that the corresponding one-way clutch is ON in an engine drive condition but this engagement is not always required (indicating lock) because the power transmission is ensured by the clutch or brake which is incorporated in parallel with the one-way clutch. "(L)" indicates that the corresponding one-way clutch is ON only in the engine drive condition and is OFF in the engine brake condition. The mark "f" indicates that the corresponding one-way clutch is free.

Figure 6:
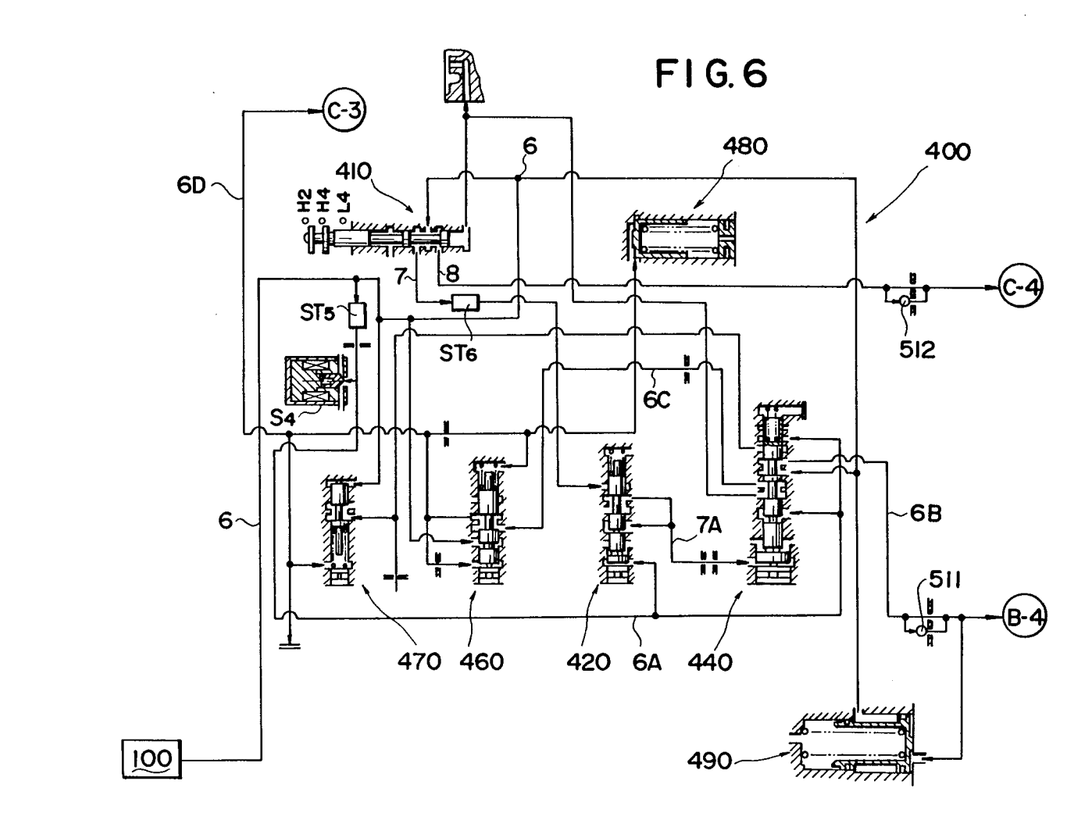
FIG. 6 is a hydraulic circuit diagram of a sub transmission of an automatic four speed range transmission adopting the hydraulic control system of the present invention.
Figure 7:
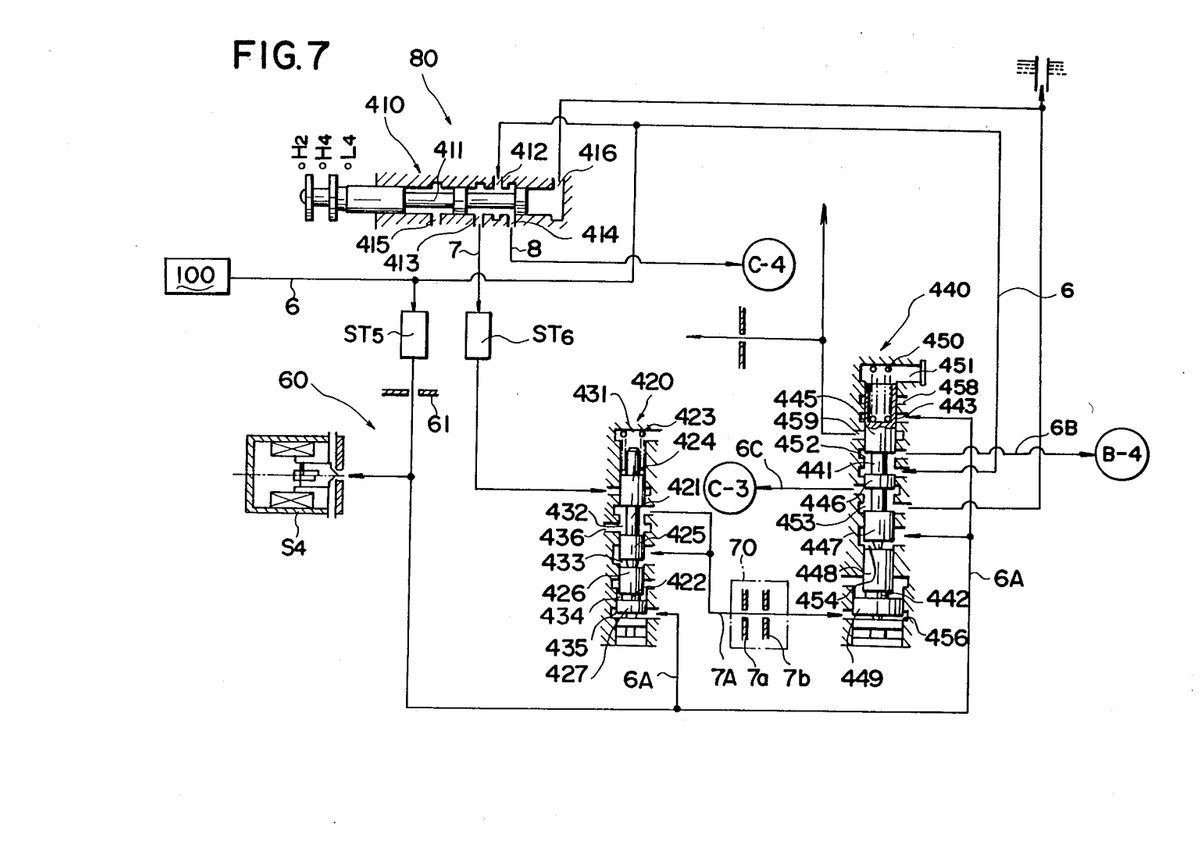
FIG. 7 illustrates in greater deal the principal part of FIG. 6.

FIG. 6 shows a hydraulic circuit of the transfer controller 400 which is a sub hydraulic controller of the four wheel driving transfer 40, and FIG. 7 shows in greater detail the principal part of FIG. 6.

The transfer controller 400 is supplied with the line pressure from the oil passage 1 of the main hydraulic controller 100 through the manual valve 210. When the manual valve 210 is in the parking (P) position, the supply of the line pressure to the transfer controller 400 is prevented, as shown in Table 3, and only the first output shaft 42 is fixed independently of the set position of the shift lever of the four wheel driving transfer 40 to thereby diminish the load to the parking mechanism and obtain a stable parking performance at all times.

Numeral 60 denotes a first hydraulic signal generating means and numeral 410 denotes a transfer manual valve which serves as both a second hydraulic signal generating means 80 and a shift range selecting means. By operating the shift lever provided near the driver's seat the line pressure oil fed from the oil passage 6 is fed to oil passages 7 and 8. Numeral 420 denotes a relay valve; numeral 440 denotes an inhibitor valve for changing over the engagement of the clutch C3 and the brake B4; numeral 460 denotes a third accumulator control valve; numeral 470 denotes a shift timing valve; numeral 480 denotes an accumulator for smoothing the engagement of the clutch C3; and numeral 490 denotes an accumulator for smoothing the engagement of the brake B4. Numerals 511 and 512 denote flow control valves each provided with a check valve for controlling the flow rate of the line pressure oil fed to the hydraulic servomechanisms B-4, C-3 and C-4 of the brake B4 and the clutches C3, C4. ST5 and ST6 represent oil strainers. 6A, 6B, 6C, 6D, 7, 7A and 8 represent oil passages for connecting between valves and the hydraulic cylinders of clutches and brakes.

The transfer manual valve 410, as shown in FIG. 7, has a spool 411 connected to a shift lever (not shown) provided near the driver's seat, and is further provided with an in-port 412 which communicates with the oil passage 6 of the main hydraulic controller 100 of the automatic four speed range transmission 10, an out-port 413 which communicates with the oil passage 7, an out-port 414 which communicates with the oil passage 8, as well as drain ports 415 and 416. In the transfer manual valve 410, when the spool 411 is set to the position of the two-wheel drive high speed range (H2), the oil passages 6 and 7 are interconnected and the oil passage 8 is connected to the drain port 416, and a second hydraulic signal is produced in the oil passage 7. Further, when set to the position of the four-wheel drive high speed range (H4), the transfer manual valve 410 connects the oil passage 6 with the oil passages 7 and 8 and produces a second hydraulic signal in the oil passage 7. When set to the four-wheel drive low speed range (L4) position, the oil passages 6 and 8 are interconnected and the oil passage 7 is connected to the drain port 415, and the second hydraulic signal is discharged from the oil passage 7.

The relay valve 420 has a spool 421 and a plunger 422 which is connected in series with the spool 421.

The spool 421 has an upper-end land 424 and a lower-end land 425 both of the same diameter, with a spring 423 attached to the back of the upper-end land 424.

The plunger 422 has an upper-end land 426 of the same diameter as the lands of the spool 421 and a lower-end land 427 of a diameter larger than that of the upper-end land 426.

By the spool 421 and plunger 422 there are formed an upper-end oil chamber 431, a first intermediate oil chamber 432 between the upper-end land 424 and the lower-end land 425, a second intermediate oil chamber 433 between the spool 421 and the plunger 422, a third intermediate oil chamber 434 between the upper-end land 426 and the lower-end land 427, and a lower-end oil chamber 435.

In the relay valve 420, the oil pressure from the first hydraulic signal generating means 60 is fed to the lower-end oil chamber 435 through the oil passage 6A, and when the spool 421 and the plunger 422 are set to upper positions in the figure, the oil passage 7 and the line pressure supply passage 7A are interconnected through the first intermediate oil chamber 432, and by changeover of the transfer manual valve 410 it becomes possible to supply and discharge a line pressure signal (the second hydraulic signal) to and from a lower-end oil chamber 456 of the inhibitor valve 440 and the oil passage 7 and the line pressure supply passage 7A become interconnected.

When a line pressure signal (the second hydraulic signal) is fed to the lower-end oil chamber 456 of the inhibitor valve 440 by change-over of the transfer manual valve 410, the spool 421 is fixed to its upper position because a feedback pressure is fed to the second intermediate chamber 433. At this time, where the first hydraulic signal from the first hydraulic signal generating means 60 is discharged from the lower-end oil chamber 435, the plunger 422 is set to its lower position, but the spool 421 remains fixed to its upper position, thus maintaining the state of supply of the line pressure signal (second hydraulic signal) to the lower-end oil chamber 456 of the inhibitor valve 440

When from this state the line pressure signal (second hydraulic signal) in the oil passage 7 is discharged by the transfer manual valve 410, or when the line pressure signal (second hydraulic signal) is discharged from the lower-end oil chamber 456 of the inhibitor valve 440 by the transfer manual valve 410 and in this state the first hydraulic signal provided from the first hydraulic signal generating means 60 is discharged from the lower-end oil chamber 435, the spool 421 and the plunger 422 are set to lower positions by virtue of the spring 423 and the line pressure supply passage 7A comes into connection with the drain port 436 through the first intermediate oil chamber 432.

When the spool 421 is set to its lower position, the supply of the line pressure signal (second hydraulic signal) to the lower-end oil chamber 456 of the inhibitor valve 440 by the transfer manual valve 410 is not performed, which signal remains discharged, and the spool 441 and plunger 442 of the inhibitor valve 440 are set to their lower positions.

The inhibitor valve 440 is provided with the spool 441 as a change-over valve and the plunger 442 and has a first set position (lower position) and a second set position (upper position).

As shown in FIG. 7, the spool 441 is adapted to move between a first set position (lower position) and a second set position (upper position) to thereby supply and discharge the line pressure oil to and from the hydraulic servomechanism C-3 of the clutch C3 and the hydraulic servomechanism B-4 of the brake B4.

The spool 441 has a sleeve-like upper-end land 445, a lower-end land 447 and an intermediate land 446 which are of the same diameter, with a spring 450 being attached to the back of the upper-end land 445 which spring is a means for urging the spool 441 to the first set position.

The plunger 442, which is connected in series with the spool 441, has a first set position (lower position) and a second set position (upper position), and when urged to the second set position (upper position) with the second hydraulic signal provided from the transfer manual valve 410 as the second hydraulic signal generating means 80, the spool 441 is brought into the second set position.

The plunger 442 has an upper-end land 448 of the same diameter as the lands of the spool 441 and a lower-end land 449 of a larger diameter than the upper-end land 448.

By the spool 441 and plunger 442 there are formed an upper-end oil chamber 451, first and second intermediate oil chambers 452 and 453 respectively between the sleeve-like land 445 and the intermediate land 446 and between the latter and the lower-end land 447, an oil chamber 454 between the spool 441 and the plunger 442, and a lower-end oil chamber 456.

In the inhibitor valve 440, when the spool 441 is set to its lower position, the upper-end oil chamber 451 communicates with the oil passage 6A through an oil port 443 of the sleeve-like land 445, the first intermediate oil chamber 452 provides communication between the line pressure oil passage 6 and the low speed oil passage 6B, and the second intermediate oil chamber 453 provides communication between the high speed oil passage 6C and a drain port 457.

When the spool 441 is set to its upper position, the upper-end oil chamber 451 communicates with a drain port 458 through the oil port 443 of the sleeve-like land 445; the first intermediate oil chamber 452 provides communication between the low speed oil passage 6B and a drain port 459; the second intermediate oil chamber 453 provides communication between the line pressure oil passage 6 and the high speed oil passage 6C; the oil chamber 454 communicates with the oil passage 6A in which is generated the first hydraulic signal from the first hydraulic signal generating means 60 which normally not only urges the spool 441 to the second set position (upper position) but also urges the plunger 442 to the first set position (lower position); and the lower-end oil chamber 456 communicates with the line pressure supply oil passage 7A in which is generated the second hydraulic signal from the transfer manual valve 410 as the second hydraulic signal generating means 80 which normally urges the plunger 442 to the second set position (upper position), through double orifices 7a and 7b as means 70 for delaying the second hydraulic signal in the passage 7A which orifices function to render the discharge flow rate of the second hydraulic signal smaller than the supply flow rate of the first hydraulic signal and exhibit through a large-diameter double orifice 7a and 7b a throttling performance equal to that of a small-diameter single orifice.

The first hydraulic signal generating means 60 has a later-described electronic controller 500 (FIG. 8), a restriction 61 provided in the oil passage 6A which communicates with the line pressure oil passage 6, and a solenoid valve S4 which is turned ON and OFF in accordance with the output of the electronic controller 500.

When the vehicular running condition judged from the electronic controller 500 is within a speed change allowable region from the two-wheel drive high speed range (H2) or four-wheel drive high speed range (H4) to the four-wheel drive low speed range (L4), the solenoid valve S4 is turned ON to discharge the oil pressure of the oil passage 6A, while when such vehicular running condition is within a speed change allowable region from the four-wheel drive low speed range (L4) to the two-wheel drive high speed range (H2) or four-wheel drive high speed range (H4), the solenoid valve S4 is turned OFF and causes the line pressure of the line pressure oil passage 6 to be generated in the oil passage 6A.

Further, when the vehicular running condition judged from the electronic controller 500 is within a speed change restrictive region from the four-wheel drive low speed range to the two-wheel drive high speed range (H2) or four-wheel drive high speed range (H4), the solenoid valve S4 is turned ON and discharges the oil pressure of the oil passage 6A, while when such running condition is within a speed change restrictive region from the two-wheel drive high speed range (H2) or four-wheel drive high speed range (H4) to the four-wheel drive low speed range (L4), the solenoid valve is turned OFF and causes the line pressure of the line pressure oil passage 6 to be generated in the oil passage 6A.

As a result, an oil pressure related to the H2·H4→L4 speed change allowable region or L4→H2·H4 speed change allowable region is generated in the oil passage 6A, while an oil pressure related to the H2·H4→L4 speed change restrictive region or L4→H2·H4 speed change restrictive region is produced in the oil passage 6A.

The following description is now provided about the operation in each set range of the four wheel driving transfer 40.

(A) When the transfer manual valve 410 is set to the two-wheel drive high speed range (H2), the oil passage 8 is pressure-released, so the clutch C4 is turned OFF by the pressure release of the hydraulic servomechanism C-4 and power is not transmitted to the four wheel driving sleeve 51, that is, the two-wheel drive high speed range (H2) is maintained. Further, a line pressure signal as the first hydraulic signal is generated in the oil passage 7.

When the solenoid valve S4 is turned OFF, the spool 421 and the plunger 422 are set to the respective upper positions because the lower-end oil chamber 435 of the relay valve 420 is supplied with oil pressure; the oil passage 7 and the line pressure supply oil passage 7A come into communication with each other; a line pressure signal is fed to the lower-end oil chamber 456 of the inhibitor valve 440; the spool 441 and the plunger 442 are set to the respective second set positions (upper positions); and the low speed oil passage 6B comes into communication with the drain port 459 and its pressure is released, whereby the hydraulic servomechanism B-4 is pressure-released and so the brake B4 is turned OFF. Since the spool 441 and the plunger 442 of the inhibitor valve 440 are in the second set positions (upper positions), the high speed oil passage 6C is in communication with the line pressure oil passage 6 and also with the oil passage 6D through the third accumulator control valve 460, thereby supplying the line pressure to the hydraulic servomechanism C-3 to turn ON the clutch C3. Consequently, the four wheel driving transfer 40 is set to the two-wheel drive high speed range (H2).

At this time, the spool 421 is fixed to its upper position because the second intermediate oil chamber 433 of the relay valve 420 is supplied with feedback pressure, so when the solenoid valve S4 is turned ON and the oil pressure is discharged from the lower-end oil chamber 435, only the plunger 422 is set to its lower position and the spool 421 remains set at its upper position, allowing a line pressure signal to be fed to the lower-end oil chamber 456 of the inhibitor valve 440. Consequently, the four wheel driving transfer 40 maintains the two-wheel drive high speed range (H2).

(B) When the transfer manual valve 410 is set to the four wheel drive high speed range (H4), the line pressure is fed to both oil passages 7 and 8.

When the solenoid valve S4 is turned OFF, the spool 421 and the plunger 422 are set to their upper positions because the lower-end oil chamber 435 of the relay valve 420 is supplied with oil pressure; the oil passage 7 and the line pressure supply oil passage 7A come into communication with each other; a line pressure signal is fed to the lower-end oil chamber 456 of the inhibitor valve 440; the spool 441 and the plunger 442 are set to their second set positions (upper positions); and the low speed oil passage 6B comes into communication with the drain port 459 and its pressure is released, whereby the hydraulic servomechanism B4 is pressure-released and so the brake B4 is turned OFF. Since the spool 441 and the plunger 442 of the inhibitor valve 440 are in their second set positions (upper positions), the high speed oil passage 6C comes into communication with the line pressure oil passage 6 and also with the oil passage 6D through the third accumulator control valve 460, thereby supplying the line pressure to the hydraulic servomechanism C-3 to turn ON the clutch C3.

The line pressure fed to the oil passage 8 is supplied to the hydraulic servomechanism C-4 to turn ON the clutch C4, whereby the four wheel driving transfer 40 is set to the four-wheel drive high speed range (H4).

At this time, the spool 421 is fixed to its upper position because the second intermediate oil chamber 433 of the relay valve 420 is supplied with feedback pressure, so when the solenoid valve S4 is turned ON and the oil pressure is discharged from the lower-end oil chamber 435, only the plunger 422 is set to its lower position and the spool 421 remains set at its upper position, allowing a line pressure signal to be fed to the lower-end oil chamber 456 of the inhibitor valve 440. Therefore, the four wheel driving transfer 40 maintains the four-wheel drive high speed range (H4).

(C) When the transfer manual valve 410 is set to the four-wheel drive low speed range (L4), the oil passage 7 and the line pressure supply oil passage 7A are pressure-released and the line pressure is fed to the oil passage 8 independently of in what condition the relay valve 420 is set, whereby the clutch C4 is turned ON to maintain the four-wheel drive high speed range (H4) or four-wheel drive low speed range (L4).

When the solenoid valve S4 is held OFF within the speed change restrictive region from the two-wheel drive high speed range (H2) or four-wheel drive high speed range (H4) to the four-wheel drive low speed range (L4), the line pressure is fed from the oil passage 6A to the oil chamber 454, and when the transfer manual valve 410 is set to the four-wheel drive low speed range (L4), the line pressure signal which has been fed to the lower-end oil chamber 456 is discharged from the line pressure supply oil passage 7A through the double orifices 7a and 7b, so the plunger 442 of the inhibitor valve 440 is set to its first set position (lower position) by the line pressure applied to the oil chamber 454, but the spool 441 of the inhibitor valve 440 remains set at its second set position (upper position) and causes no speed change, thereby preventing overrun of the engine E and the occurrence of a speed change shock. AT this time, the discharge of pressure from the lower-end oil chamber 456 is performed slowly through the double orifices 7a and 7b thereby preventing a malfunctional speed change to the four-wheel drive low speed range (L4) from the two-wheel drive high speed range (H2) or four-wheel drive high speed range (H4) while the vehicular running condition is in the speed change restrictive region which malfunctional speed change could be caused by a rapid movement of the plunger 442 and the resultant decrease of the oil pressure applied to the oil chamber 454 and movement of the spool 441 to its first set position (lower position).

When the transfer manual valve 410 is set to the four-wheel drive low speed range (L4) while the solenoid valve S4 is held ON in the H2·H4→L4 speed change allowable region, or when the solenoid valve S4 is turned OFF in the H2·H4→L4 speed change restrictive region and at this time the H2·H4→L4 speed change restrictive region shifts to the H2·H4→L4 speed change allowable region in the four-wheel drive low speed range (L4) condition of the transfer manual valve 410 thereby allowing the solenoid valve S4 to be turned from OFF to ON, the spool 441 is set to its first set position (lower position) by the action of the spring 450 because the oil passage 6A is pressure-released, whereby the line pressure oil passage 6 and the low speed oil passage 6B are brought into communication with each other to supply the hydraulic oil to the hydraulic servomechanism B-4 of the brake B and the high speed oil passage 6C comes into communication with the drain port 457 and its pressure is thereby discharged, so the oil pressure of the hydraulic servomechanism C-3 of the clutch C3 is discharged. As a result, the four wheel driving transfer 40 is set to the four-wheel drive low speed range (L4). Once this low sped range (L4) is set, even if the speed change region becomes the H2·H4→L4 speed change restrictive region and the solenoid valve S4 is turned OFF, the line pressure of the oil passage 6A is applied to the oil chamber 454 of the inhibitor valve 440 and at the same time applied to the upper-end oil chamber 451 through the oil port 443 of the sleeve-like land 445 of the spool 441, so the four-wheel drive low speed range (L4) is maintained without displacement of the spool 441.

(D) When the four-wheel driving transfer 40 is in the four-wheel drive low speed range (L4) and the transfer manual valve 410 is set from the four-wheel drive low speed range (L4) to the two-wheel drive high speed range (H2) or four-wheel drive high speed range (H4), the line pressure is supplied to the oil passage 7. In this state, when the vehicular running condition is in the L4→H2·H4 speed change restrictive region and the solenoid valve S4 is ON, the oil pressure is discharged from the lower-end oil chamber 435 of the relay valve 423, and since the spring 421 and the plunger 422 are held in their lower positions by virtue of the spring 423, the oil passage 7 and the line pressure supply oil passage 7A are out of communication with each other, thus allowing the oil pressure of the lower-end oil chamber 456 of the inhibitor valve 440 to be discharged from the drain portion 436 of the relay valve 420. Consequently, the spool 441 and plunger 442 of the inhibitor valve 440 are brought down to their lower positions by virtue of the spring 450 to turn OFF the clutch C3, while the brake B4 is ON, so that the four wheel driving transfer 40 is set to the two-wheel drive low speed range (L2) when the transfer manual valve 410 is set to the two-wheel drive high speed range (H2) or four-wheel drive low speed range (L4) when the transfer manual valve 410 is set to the four-wheel drive high speed range (H4).

When the vehicular running condition is L4→H2·H4 speed change allowable region and the solenoid S4 is turned OFF, the spool 421 and the plunger 422 are set to their upper positions because the lower-end oil chamber 435 of the relay valve 420 is supplied with oil pressure; the oil passage 7 and the line pressure supply oil passage 7A come into communication with each other; a line pressure signal is fed to the lower-end oil chamber 456 of the inhibitor valve 440; the spool 441 and the plunger 442 are set to their second set positions (upper positions); and the low speed oil passage 6B comes into communication with the drain port 459 and its pressure is discharged, whereby the brake B4 is released. Since the spool 441 and plunger 442 of the inhibitor valve 440 are set to their second set positions (upper positions), the high speed oil passage 6C communicates with the line pressure oil passage 6 and also with the oil passage 6D through the third accumulator control valve 460 to turn ON the clutch C3. Consequently, the four wheel driving transfer 40 is set to the two-wheel drive high speed range (H2) or four-wheel drive high speed range (H4).

Table 3 shows a state of communication between the oil passage 1 and the oil passages 2 to 6 in the shift positions of the shift lever of the automatic four speed range transmission 10.

The manual valve 210, which is connected to the shift lever attached to the driver's seat, is manually moved to any of the positions of P (Parking), R (Reverse), N (Neutral), D (Drive), S (Second) and L (Low) according to the range of the shift lever. Table 3 shows a state of communication between the oil passage 1 and the oil passages 2 to 6 in the shift ranges of the shift lever, in which the "O" mark indicates a communicated state and the supply of line pressure, while the "X" mark indicates the discharge of pressure.

TABLE 3

|  | P | R | N | D | S | L |
|---|---|---|---|---|---|---|
| Oil Passage 2 | X | X | X |  |  |  |
| Oil Passage 3 | X | X | X | X |  |  |
| Oil Passage 4 | X | X | X | X | X |  |
| Oil Passage 5 | X |  | X | X | X | X |
| Oil Passage 6 | X |  |  |  |  |  |

Table 4 shows a state of communication between the oil passage 6 and the oil passages 7, 8 in the shift positions of the sub transmission.

TABLE 4

|  | H2 | H4 | L4 |
|---|---|---|---|
| Oil Passage 7 |  |  | X |
| Oil Passage 8 | X |  |  |

In the Tables 3 and 4, the "O" mark indicates a communicated state and the supply of line pressure, while the "X" mark indicates the discharge of pressure.

Figure 8:
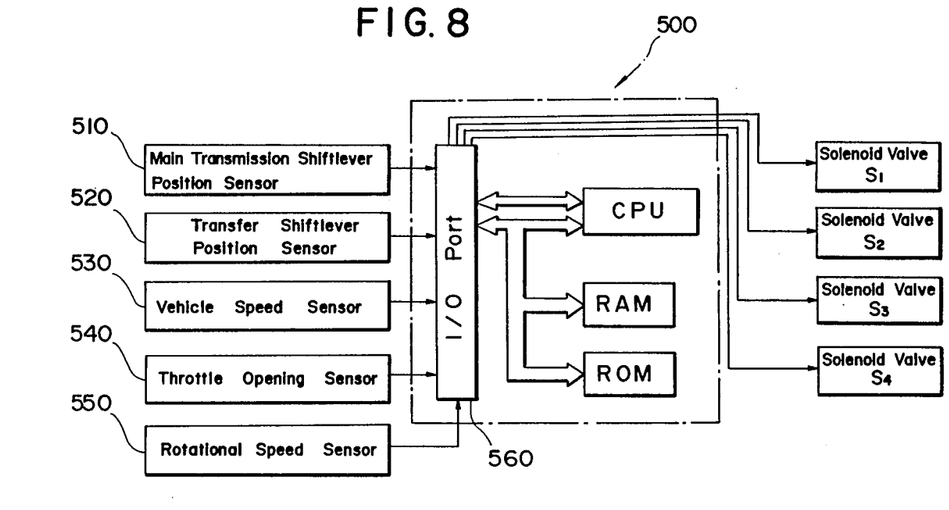
FIG. 8 is a block diagram of an electronic controller adopted in a four wheel driving automatic transmission.

FIG. 8 is a block diagram of the electronic controller 500 applied to this embodiment.

The electronic controller 500 judges vehicular running conditions in accordance with input signals from sensors as will be explained below and controls the energization of the solenoid valves S1 to S4 of the main hydraulic controller 100 of the automatic four speed range transmission 10 and the transfer controller 400.

Numeral 510 denotes a main transmission shift lever position sensor for detecting a set range position of the main transmission; numeral 520 denotes a transfer shift lever position sensor for detecting a set range position of the sub transmission; numeral 530 denotes a vehicle speed sensor which converts a signal detected from the output shaft revolution of the four wheel driving transfer 40 into a vehicle speed; numeral 540 denotes a throttle opening sensor which detects an operated amount of the accelerator pedal; and numeral 550 denotes a revolution sensor of the revolution detecting means for detecting the revolution of the output shaft 32 of the automatic four speed range transmission 10. Numeral 560 denotes an I/O port serving as both an input port from the above sensors and an output port to the solenoid valves S1–S4 CPU represents a central processing unit; RAM represents a random access memory; and ROM represents a read only memory which stores speed change patterns such as speed change points and lockup points as well as data of the H2·H4→L4 speed change allowable region (or L4→H2·H4 speed change restrictive region) and L4→H2·H4 speed change allowable region (or H2·H4→L4 speed change restrictive region).

This embodiment has the following effects.

(a) During vehicular running at a high speed, it is possible to prevent engine overrun caused by a sudden down shift.

(b) Because of a double orifice, a large orifice diameter permits obtaining an equal performance to that of a small orifice, and an orifice clogging is difficult to occur and a good machinability is attained.

The present disclosure relates to subject matter contained in Japanese Patent Application No. 59-226452 (filed Oct. 26th, 1984) which is imcorporated herein by reference.

It will be understood that the above description of the present invention is susceptible to various modifications, changes and adaptations, and the same are intended to be comprehended within the meaning and range of equivalents of the appended claims.

I claim:

1. A hydraulic control system for an automatic transmission having an inhibitor valve, said inhibitor valve comprising
a change-over valve having a first set position and a second set position and functioning to supply and discharge a hydraulic pressure to and from a hydraulic servomehcanism for a friction engaging element through its movement between said first and second set positions;
a means for urging said change-over valve to said first set position; and
a plunger having a first set position and a second set position and functioning to bring said change-over valve into said second set position when the plunger is urged to said second set position;
said inhibitor valve functioning to perform the supply and discharge of the hydraulic pressure to and from the hydraulic servomechanism in accordance with a first hydraulic signal and a second hydraulic signal through a first hydraulic signal generating means which produces said first hydraulic signal for urging said change-over valve to said second set position and urging said plunger to said first set position;
a second hydraulic generating means for producing said second hydraulic signal for urging said plunger to said second position; and
a means for delaying a discharge of said second hydraulic signal;
said first hydraulic signal generating means comprising an electronic controller receiving vehicular running conditions such as a vehicle speed and a throttle opening, said electronic controller evaluating the vehicular running conditions and generating a signal corresponding to the evaluation, a solenoid valve energized and deenergized in accordance with the output signal of said electronic controller, and an orifice formed in a first hydraulic signal generating oil passage in which said solenoid valve is provided.

2. A hydraulic control system for an automatic transmission as set forth in claim 1, wherein said first hydraulic signal is a signal corresponding to a vehicular running condition and said second hydraulic signal is a driver's selection signal.

3. A hydraulic control system for an automatic transmission as set forth in claim 1, wherein said second hydraulic signal delaying means is a double orifice provided in an oil passage which communicates said inhibitor valve with said manual valve.

4. A hydraulic control system for an automatic transmission as set forth in claim 1, wherein said second hydraulic signal generating means is a manual valve having a high speed range set position and a lower speed range set position, said manual valve being adapted to supply the second hydraulic signal at the high speed range set position and to discharge the second hydraulic signal at the low speed range set position.

5. A hydraulic control system for an automatic transmission as set forth in claim 1, wherein said plunger is connected in series with said change-over valve, said change-over valve having a sleeve-like land at one end with a spring connected thereto as said urging means and an opposite-end land, said sleeve-like land having an oil port, said plunger having a one-end land and an opposite-end land of a larger diameter than that of the one-end land, whereby a one-end oil chamber, in which said second hydraulic signal is supplied, is formed by the opposite-end land of said plunger; an intermediate oil chamber, in which said first hydraulic signal is supplied, being formed between the opposite-end land of said change-over valve and the one-end land of said plunger, and an opposite end oil chamber, in which said first hydraulic signal is supplied through the oil port when said change-over valve is shifted to said first set position, being formed by the sleeve-like land of said change-over valve.

* * * * *

UNITED STATES PATENT AND TRADEMARK OFFICE
CERTIFICATE OF CORRECTION

PATENT NO. : 4,718,311

DATED : January 12, 1988

INVENTOR(S) : Yoichi Hayakawa et al

It is certified that error appears in the above-identified patent and that said Letters Patent is hereby corrected as shown below:

In the heading of the patent, under [73], first and third lines, the cities of the assignees should be --Anjo-- and --Toyota--, respectively.

Signed and Sealed this

Twenty-eighth Day of March, 1989

Attest:

DONALD J. QUIGG

Attesting Officer

Commissioner of Patents and Trademarks